United States Patent [19]

Blum

[11] Patent Number: 4,628,193

[45] Date of Patent: Dec. 9, 1986

[54] CODE READING OPERATIONS SUPERVISOR

[76] Inventor: Alvin S. Blum, 2350 Del Mar Pl., Fort Lauderdale, Fla. 33301

[21] Appl. No.: 116,678

[22] Filed: Jan. 30, 1980

[51] Int. Cl.$^4$ .............................................. G06F 15/20
[52] U.S. Cl. ...................................... 235/375; 235/472
[58] Field of Search ............... 235/375, 472, 432, 454, 235/491, 493, 419, 433; 340/149 A, 146.3 SY, 152 R; 360/4; 364/413, 705

[56] References Cited

U.S. PATENT DOCUMENTS

| | | | |
|---|---|---|---|
| 3,422,441 | 1/1969 | Chapsky | 360/4 |
| 3,848,112 | 11/1974 | Weichselbaum | 364/413 |
| 3,920,979 | 11/1975 | Kilby | 364/705 |
| 3,932,730 | 1/1976 | Ambrosio | 235/432 |
| 3,991,299 | 11/1976 | Chadima | 235/472 |
| 4,053,735 | 10/1977 | Foudos | 235/419 |
| 4,158,194 | 6/1979 | McWaters | 340/146.3 SY |
| 4,251,798 | 2/1981 | Swartz | 340/146.3 SY |

*Primary Examiner*—Harold I. Pitts
*Attorney, Agent, or Firm*—Alvin S. Blum

[57] ABSTRACT

Hand held electronic apparatus for supervising and controlling operations requiring a worker to travel to multiple sites, correctly identify subjects or objects, and treat each one according to special instructions on the basis of that identification. The apparatus disclosed provides machine reading means to ensure positive identification, audible and visible displays, internal data storage and processing and means for communication with a central computer system. Applications are described for control of a parcel delivery service and supervision of a hospital medication program and a patient blood sample identification system for a hospital laboratory service.

11 Claims, 4 Drawing Figures

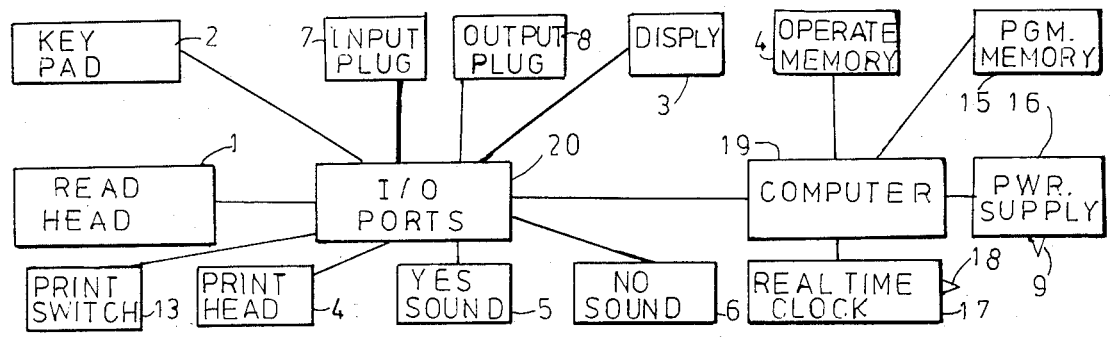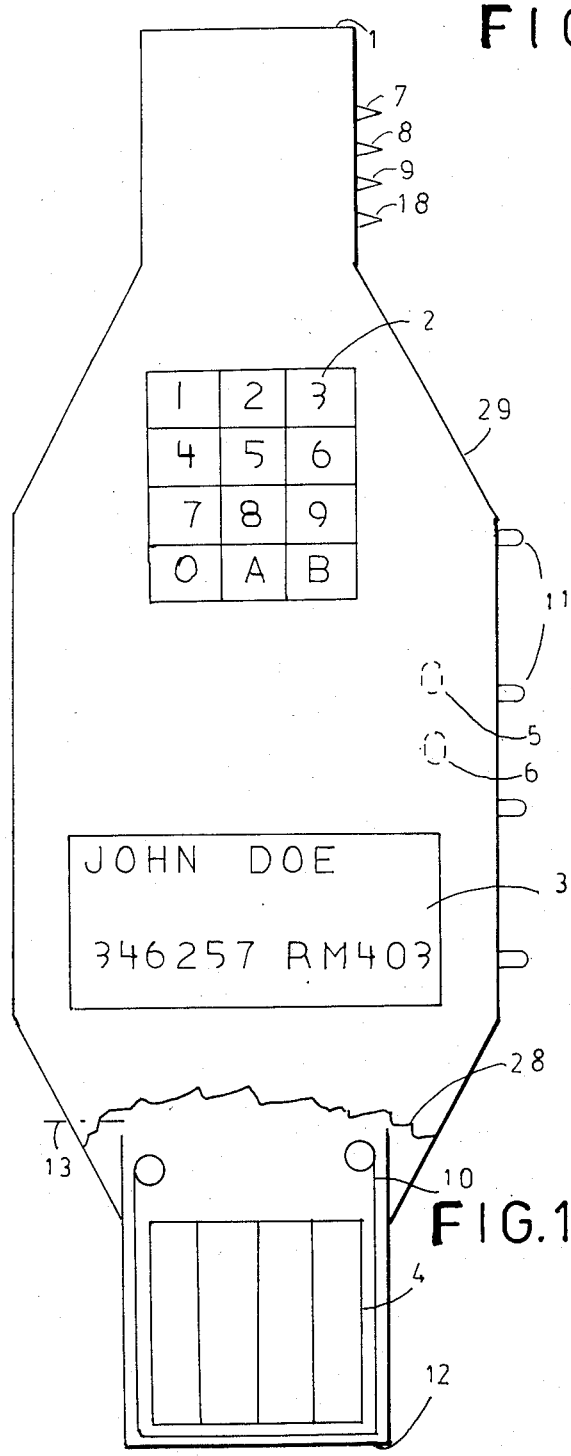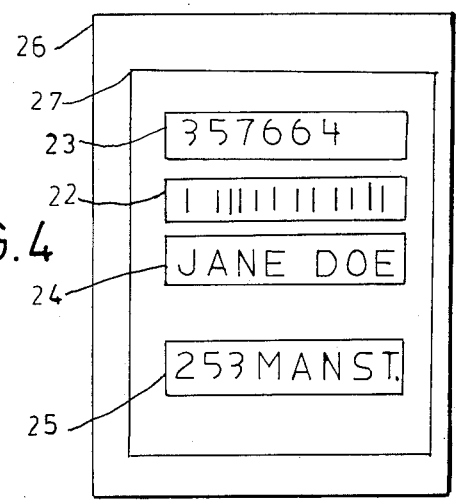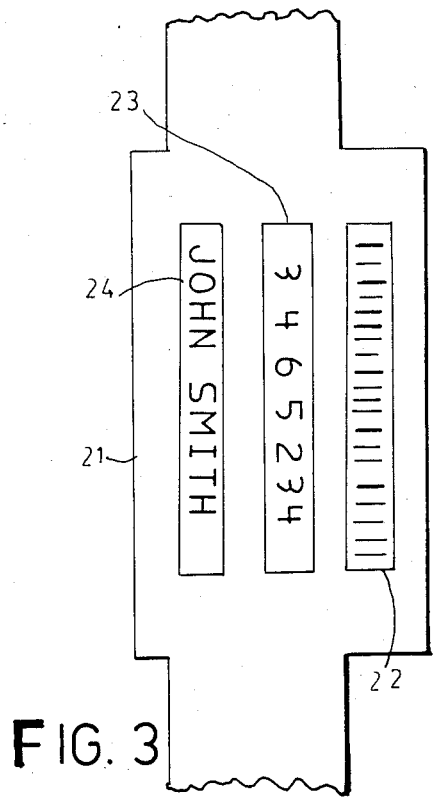

CODE READING OPERATIONS SUPERVISOR

This invention relates generally to a portable, self contained, electronic device for reading identifying codes on subjects or objects for matching these with corresponding codes on items or lists for supervision and control of operations and elimination of errors due to mismatching. Said devices may include data storage processing and display means and means for communication with a larger computer system.

BACKGROUND OF THE INVENTION

There are situations in the workplace wherein a worker must perform duties in many locations away from direct supervision. The worker may be called upon to identify a plurality of subjects or objects and treat each one in a unique manner as indicated by a list of specific instructions. If the worker fails to match the particular subject with the correct treatment, it may not be evident until unfavorable consequences have resulted.

SUMMARY

This invention relates to apparatus which can be carried by the worker to different locations where it can be used to identify positively subjects and items bearing machine readable indicia. The invention includes self contained electronic data processing means to control and monitor worker operations to avoid errors of mistaken identification and improve and reduce the cost of such operations.

When the subjects to be identified are humans and the consequence of erroneous identifications is untimely death, improved control of such unsupervised activity warrants our best inventive efforts. Such is the case, for example, in hospital practice when medication is administered to patients in their hospital beds. A list is generally prepared identifying each patient by bed location, name, medical record number, type of medication, route of administration, dose, and time. For more positive identification, a wrist band gives patient name and number, which are to be matched with that on the list before medication is administered. Some hospitals have unit dose pharmacy systems wherein each dose is packaged separately by pharmacy with patient identification on the package to further reduce medication errors. Despite these safeguards and intensive training, many accredited hospitals regularly report more than a dozen incidents of medication errors every month. The true incidence must be many times the reported incidence. It is an object of the present invention to reduce these errors by application of electronic technology including machine reading of identifying codes by a self contained data processor.

Another vital hospital operation wherein the invention may be applied involves withdrawing blood samples for laboratory analysis and identifying the specimens as having come from specific patients. Erroneous diagnostic conclusions based upon incorrect specimen identification can be just as life threatening as medication errors. Prior art includes the use of pads of identifying labels on the wrist band. Another system employs a wrist band carrying identifying embossing means for use with a portable label printer for labelling the sample tube. These are both awkward for the patient to carry and solve only part of the problem.

Current operating systems rely upon the worker to examine the wristband identification and match it to an operation unfailingly every time. It is an object of the present invention to ensure by electronic code reading means that the worker does indeed match the subject to the operation or item by signaling that a correct match has been made, by providing selected operating instructions, by providing other data such as time, impact printing, display storage, and communications with a central computer where evidence of correct operation may be input and new data loaded into the apparatus for another set of operations. Prior art includes NCR Corp. model 7887 hand held OCR/A reader connected to a 10 foot cable to a microprocessor control unit for POS applications.

It is an object of the present invention to disclose a self contained, portable, code reading, data processing electronic device for the supervision and control of operations requiring the correct identification of subjects or objects. The device includes means for reading machine readable information such as, for example, bar codes, OCR fonts A/B, or magnetic strips; means for storing the read information; internal means (e.g. microcomputer) for processing the read information such as comparing it with other read information or other stored information fed in from an internal clock or external terminal; audible and visible display means; manual data entry means; impact printer and input output means for communication with other data processing means.

It is an object of the present invention to provide a simple hand held electronic device to assure the correct performance of certain routine matching tasks and to enter the detailed performance data into a data processing system in a novel and cost effective manner. An audible signal indicating correct performance may be generated by correct performance to guide the operator in his work. Another audible signal may indicate error.

Because it is often useful to check off a printed list as work proceeds, impact printing means are provided in the device. The operator can use the device as a hand stamp to mark each entry on a list as he completes it. The printer may be connected to an internal clock so that time is printed. Printing may be enabled only after a correct match. By limiting use of internal power to turning a print wheel or locking selected impact wires in a dot matrix impact printing array of a spring loaded hand stamp mechanism, simple portable battery operation becomes feasible. Ink ribbon feed and impact printing are powered by the hand stamping motion. In some applications, the information fed to the print head may be related to the code read. It may stamp a patient's identification on a test tube label. It may stamp a current price, derived from a look up table in memory, on a package. It is another object of the present invention to eliminate hand entry of the stored data record of all the matching operations performed by the operator. The device includes electronic data input/output interface means for communication with another computer system. This may take the form of an electrical plug and socket or it may be through the optical means used for optical code reading. The information and programs stored in the memory of the device may provide useful information to supplement or substitute for hard copy printout such as worklists. These may be sequentially displayed on the visual display under control of pushbuttons.

BRIEF DESCRIPTION OF THE DRAWINGS

FIG. 1 is a top plan view of the apparatus with a portion of the cover broken away.

FIG. 2 is a schematic drawing of apparatus of the type to which the invention relates embodying optical character reading means.

FIG. 3 is a view of a portion of a plastic wrist band to be worn by a hospital patient for use with the invention.

FIG. 4 is a view of a package with label for use with the invention.

DESCRIPTION OF THE PREFERRED EMBODIMENT

The device 29 shown in FIG. 1 is designed to be held in one hand as indicated by finger grips 11. Manual input is by key pad 2, communication with an outside computer is by input plug 7 and output plug 8. FIG. 2 is a schematic diagram of the same device. The optical read head 1 is passed over characters to be read. Read and other information is stored in operating memory 14. Programs are stored in memory 15 and operations of computer 19 are passed through input/output ports 20. Internal clock 17 with reset 18 provides real time information. Power is provided by battery power supply 16 recharged through plug 9. Input, output, recharge and clock reset plugs may be part of a common plug for connection to a terminal. This provides means to load memory 14 with instructions for the day. This may be done simultaneously with printout of worksheets or labels for items. Print head 4 can be used to hand stamp information. It may be a dot matrix array or print wheels or other print mechanisms well known in the prior art. Retractable spring loaded cover sleeve 12 protects ink ribbon 10 visible where cover has been broken away at 28 in FIG. 1. Switch 13 is actuated by sleeve 12 when it retracts as head 4 is pressed against a surface. This informs computer 19 that printing has been done. The time at which this operation or read or matching operations are performed may be stored in memory 14 for future use. At the end of the work period, the record of operations stored in memory 14 may be dumped into a central computer system to provide operations data without further labor. Instructions and other useful data may be provided at visual display 3 under supervision of programs stored in memory 15 and commands from keypad 2.

A method of using the invention in a hospital medication system will now be described in connection with FIGS. 1, 2 and 3. A nurse is assigned the task of medicating patients on her ward as prescribed by their physicians. Physicians' orders have been entered into the central computer system. These orders have been checked by pharmacy and individual doses have been separately packaged accordingly with a correct patient label printed by the computer and attached to each package. The label includes dose, route (intravenous, oral), time and a machine readable code number. Bulk items which may be stored on the ward, such as saline solutions, have all been labelled in advance with machine readable labels indicating that they are saline bottles, etc. The invention shown in FIG. 1 is plugged into a terminal by a single plug incorporating input 7, output 8, recharge 9 and time reset 18. Keyboard 2, via plug 8, commands terminal to print a worklist (or series of cards) of patients, their identification numbers, their bed locations, medication, dose, route of administration, and time. Beside each entry is a machine readable identifying code which may be unique for that patient, or even more unique for that particular dose. At the same time, similar information, via plug 7 is loaded into the memory 14 of the electronic supervisor 29. Using the information on the worklist, the nurse loads up a cart with the necessary supplies and medications, and goes to the bed of the first patient. The patient wears a plastic wristband as shown in FIG. 3. The band bears the patient name 24 and hospital identification number 23. In addition it carries a machine readable number. This may take the form of the bar code 22 or the patient number 23 may be printed in a machine readable format such as the currently available OCRA/B. Using one hand to extend the patient's wrist, the nurse visually ascertains that the name and number on the wristband correspond with the worklist entry. Holding the device 29 of FIG. 1 in her other hand by finger grips 11, the read head 1 is passed over bar code 22 of the wristband of FIG. 3. An audible yes signal 5 indicates a successful read. She then passes the read head over the code on the worklist entry. This is followed by another yes signal indicating a successful read. An audible no signal 6 sounds if the two do not correspond. If the two codes match, a double yes signal follows indicating she may proceed with the treatment. She notes the information on the worklist and sets aside the appropriate supplies (syringe, cup, swab) and the medication or the single dose medication package from the cart. She runs the read head 1 over the code on the medication package. Audible yes signal 5 sounds indicating a successful read. This is followed by a double yes signal indicating it is safe to proceed with the administration. The codes on the wristband, the worklist and the medication package may all be different but known by the computer to be corresponding. This precludes the employee subterfuge of running the reader over the same code three times. On completion of the treatment, the nurse stamps the correct time on the worklist entry by means of the print head 4 which is driven by internal clock 17. Noted in memory 14 is the time of administration for later automatic entry into the central computer system. No signal 6 will sound if she ignores the stamp on the worklist and attempts to treat the patient a second time. Errors, special orders, dose size, even the entire worklist one entry at a time, may be presented to the operator on visual display 3. The system is fail safe and supervisory in that the nurse continues to perform her current duties and visual checks in the original way so that failure of the device doesn't interfere with her operations. The device only substitutes for her current procedure at the termination of her round wherein her hand written notation of the time of each administration is now transcribed into the record. The device will do that instantly by dumping memory 14 through output 8 into the central computer system. However the time stamped notations on the worklist or written notations are available for hand entry if the device fails at this point. The capital cost of the device and the labor cost of its use may be repaid by the labor saving in elimination of hand recording. The primary advantages of the invention are considered to be the reduction in the incidence of such common medication errors as wrong patient, wrong dosage, wrong medication, given by wrong route, at wrong time, double dose, omission of dose. These errors may aggravate and prolong illness, thereby increasing the cost of medical care. They may also lead to lawsuits, the costs of which are distributed to all hospital patients. Discovery of a medication error usually leads to costly disciplinary action including retraining, or dismissal with recruitment and training. It can be seen from the foregoing that the invention will both improve the quality of medical care and reduce the cost of medical care.

A method using the invention in a parcel delivery service will now be described in connection with FIGS. 1, 2 and 4. Each parcel 26 shown in FIG. 4 bears a label 27 with recipient name 24, address 25, package identifying number 23 and machine readable number 22. A delivery list has the same information including a corresponding machine readable number. The hand held electronic controller 29 of FIG. 1 has the same list stored in its memory 14. At each delivery location, the driven passes the read head 1 of the device over the code 22 on the package label 27 of FIG. 4, and also over the code on the delivery list. The device provides audible signal 5 and visible signal 3 indicating correct match and the driver then uses the other end 4 of the hand held controller 29 to hand stamp indicia on the list indicating the time of delivery. The printer cover sleeve 12 actuates switch 13 to store time of stamping in the memory. The delivery information may also appear on visual display 3, where it may be more easily read. Where delivery is made to a regular customer, a third machine readable code indicating customer location may be located at the customer's receiving site to further ensure correct delivery. All of these data become part of the delivery service computer record when the driver returns the device at the end of his round by dumping the portable memory 14 into the central computer through output plug 8.

A method of using the instant invention in a hospital laboratory system will now be described in connection with FIGS. 1, 2 and 3. When blood samples are withdrawn from hospital patients for laboratory analysis, each specimen must be labelled as having come from a specific patient so that the results of analysis can be correctly applied to the diagnosis and care of the patient. In current practice, a phlebotomist is dispatched from the laboratory with a tray of supplies and a list of patients to be sampled, time and type of specimen, the patient's identification number and bed location. The list may include preprinted identifying labels for the specimens or these may be written at the time of sampling. The list may consist of a stack of individual requisitions. One relies upon the integrity of the worker to never make an error of identification. These errors are more difficult for management to detect, but their frequency may be as great as medication errors. The instant invention overcomes these errors by requiring a matching of the wristband code 22 and the machine readable code at each entry on the worklist in order to get an audible yes signal 5 from the supervisor 29 of FIG. 1. This is done by passing the read head 1 over each code. Preprinted labels are beside the entry on the worklist. These are applied to the collected specimens and the worker uses the printer 4 end of the device 29 to hand stamp the time on the worklist. This time is also recorded in the memory 14. The worklist may be replaced by the visual display 3 which may be scrolled by command from keypad 2. This control may also be used to record time in absence of a stamping operation. Alternatively, the printer 4 may stamp the patient's identification on a sample tube label. The ability to instantly dump all of the evidence of sample collected into the central computer improves control of laboratory operations and allows the nursing personnel to promptly proceed with operations withheld until after blood sampling has been completed, such as feeding and treatment.

While I have shown and described the preferred embodiments of my invention, it will be understood that the invention may be embodied otherwise than as herein specifically illustrated or described, and certain changes in the form and arrangement of parts and in the specific manner of practicing the invention may be made without departing from the underlying ideas or principles of this invention within the scope of the appended claims.

What is claimed is:

1. Portable apparatus for controlling, supervising, and recording operations by an operator which require,
   1. operator travel to multiple sites remote from personal supervision,
   2. correct operator identification at said sites of unique elements, bearing machine readable identifying codes, from the group including items on lists, persons, sites, packages, pharmaceutical containers and the like, and
   3. correct treatment of said elements by said operator at said sites on the basis of said identifications, comprising:
      a. reading means for reading said machine readable identifying code data;
      b. input/output means for communicating data with external data processing and storage means;
      c. manual input means and output means for communicating with said operator;
      d. data storage means interconnected to means (a), (b) and (c) for storing data transmitted therethrough.
      e. data processing means interconnected to said data storage means to ascertain by data processes operant upon said stored data that a particular one of said identified elements at said remote site has been correctly associated with at least one other of said identified elements as required for said correct treatment;
      f. signal means connected to said data processing means to signal to said operator by a first signal when said data processing means has ascertained that a correct association of said elements has been made, and to signal by a second, different signal when an incorrect association has been made, said storage means storing data from said external data processing and storage means relating codes of elements which must be associated for said correct treatment, and said elements which must be associated for said correct treatment bearing identifying codes which are not identical to prevent said operator from defeating the system integrity by reading one of said identifying codes twice.

2. Invention of claim 1 further including internal clock means interconnected to said data storage means, said clock means providing to said data storage means time of day data at which operations are performed, said data storage means further storing time data at which operation must be performed, said data processing means further ascertaining whether said correct association of said elements has been timely made, and said signal means signalling the results of said ascertainment.

3. The invention of claim 1, wherein said reading means is an optical bar code reading means.

4. The invention of claim 1, wherein said reading means is an optical reading means and said input/output means for communicating data includes optical coupling means.

5. The invention of claim 1 further including printing means connected to said storage means for printing certain of said stored data.

6. The invention of claim 5, including hand stamp printing means wherein operator stamping motion supplies energy for the impact portion of the printing process to reduce portable electric power requirements.

7. The invention of claim 5, including means whereby operation of said printing means provides a record of said print operation to said storage means.

8. The invention of claim 1, wherein said signal means is audible.

9. The invention of claim 1, wherein said display means is visible.

10. The invention of claim 1, wherein said data processes include the steps of:
   a. storing in said storage means, from said external data processing and storage means, at least one list of sets of associated data;
   b. storing the data from a first code reading;
   c. storing the data from at least one more code reading subsequent to and not simultaneous with step (b);
   d. determining whether data from step (b) and step (c) correspond to any one set of associated data in said list stored in step (a);
   e. signalling to said operator by a first type signal when step (d) determines that a correspondence does exist;
   f. signalling to said operator by a second type signal when step (d) determines that a correspondence does not exist;
   g. storing in said storage means the results of the determination of step (d).

11. The invention of claim 2, wherein said data processes include the steps of:
   a. storing in said storage means, from said external data processing and storage means, at least one list of sets of associated data with times at which said treatments must be performed;
   b. storing the data from a first code reading including the time of reading;
   c. storing the data from at least one more code reading including the time of reading subsequent to and not simultaneously with step (b);
   d. determining whether data from step (b) and step (c) correspond to any one set of associated data in said list stored in step (a) including times of reading;
   e. signalling to said operator by a first type signal when step (d) determines that a correspondence does exist;
   f. signalling to said operator by a second type signal when step (d) determines that a correspondence does not exist;
   g. storing in said storage means the results of the determination of step (d).

* * * * *